US010432879B2

United States Patent
Chang et al.

(10) Patent No.: US 10,432,879 B2
(45) Date of Patent: Oct. 1, 2019

(54) DUAL CONVERSION GAIN HIGH DYNAMIC RANGE IMAGE SENSOR READOUT CIRCUIT MEMORY STORAGE STRUCTURE

(71) Applicant: OmniVision Technologies, Inc., Santa Clara, CA (US)

(72) Inventors: Chun-Hsiang Chang, San Jose, CA (US); Yingkan Lin, San Jose, CA (US); Jingwei Lai, San Jose, CA (US); Zhe Gao, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 95 days.

(21) Appl. No.: 15/872,741

(22) Filed: Jan. 16, 2018

(65) Prior Publication Data

US 2019/0222780 A1 Jul. 18, 2019

(51) Int. Cl.
*H04N 5/355* (2011.01)
*H04N 5/235* (2006.01)
*H04N 5/378* (2011.01)

(52) U.S. Cl.
CPC ........... *H04N 5/355* (2013.01); *H04N 5/2355* (2013.01); *H04N 5/378* (2013.01)

(58) Field of Classification Search
CPC ....... H04N 5/355; H04N 5/2355; H04N 5/378
USPC ......................................................... 348/302
See application file for complete search history.

(56) References Cited

U.S. PATENT DOCUMENTS

| 2013/0141619 | A1* | 6/2013 | Lim | H01L 27/14609 348/302 |
| 2014/0263950 | A1* | 9/2014 | Fenigstein | H04N 5/355 250/208.1 |
| 2016/0028974 | A1* | 1/2016 | Guidash | H04N 5/37455 348/294 |
| 2017/0208273 | A1* | 7/2017 | Mandelli | H04N 5/3535 |
| 2019/0020832 | A1* | 1/2019 | Takane | H04N 5/23245 |

* cited by examiner

*Primary Examiner* — Sinh Tran
*Assistant Examiner* — Zhenzhen Wu
(74) *Attorney, Agent, or Firm* — Christensen O'Connor Johnson Kindness PLLC

(57) ABSTRACT

A readout circuit includes a comparator coupled to receive a ramp signal an output of a dual conversion gain pixel. A single counter is coupled to the output of the comparator. The counter is coupled to write to only one of a first or a second memory circuits at a time. A first multiplexor is coupled to load either an initial value or an initial memory value from the first memory circuit into the counter. A second multiplexor is coupled to load either a low conversion gain memory value from the first memory circuit or a high conversion gain memory value from the second memory circuit into a single data transmitter, which is coupled to transmit the received memory value to a digital processor.

17 Claims, 3 Drawing Sheets

DUAL CONVERSION GAIN HIGH DYNAMIC RANGE IMAGE SENSOR READOUT CIRCUIT MEMORY STORAGE STRUCTURE

BACKGROUND INFORMATION

Field of the Disclosure

This disclosure relates generally to image sensors, and in particular but not exclusively, relates to dual conversion gain for high dynamic range image sensors.

Background

Image sensors have become ubiquitous. They are widely used in digital still cameras, cellular phones, security cameras, as well as, medical, automobile, and other applications. The technology used to manufacture image sensors has continued to advance at a great pace. For example, the demands of higher resolution and lower power consumption have encouraged the further miniaturization and integration of these devices.

Image sensors may implement dual conversion gain to obtain high dynamic range images. The high dynamic range images may be obtained by reading from pixels under low gain, then high gain, and then combining the two readouts to render the high dynamic range image. However, the readout circuitry and memory storage structures needed to read out the high gain as well as the low gain pixel data from dual conversion gain image sensors has required circuitry requiring relatively large layouts that consume significant amounts of semiconductor die area. It would therefore be beneficial to reduce the amount of circuit components needed to read out the high gain and low gain pixel data from such dual conversion gain image sensors to reduce layout areas and semiconductor die sizes of readout circuits.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
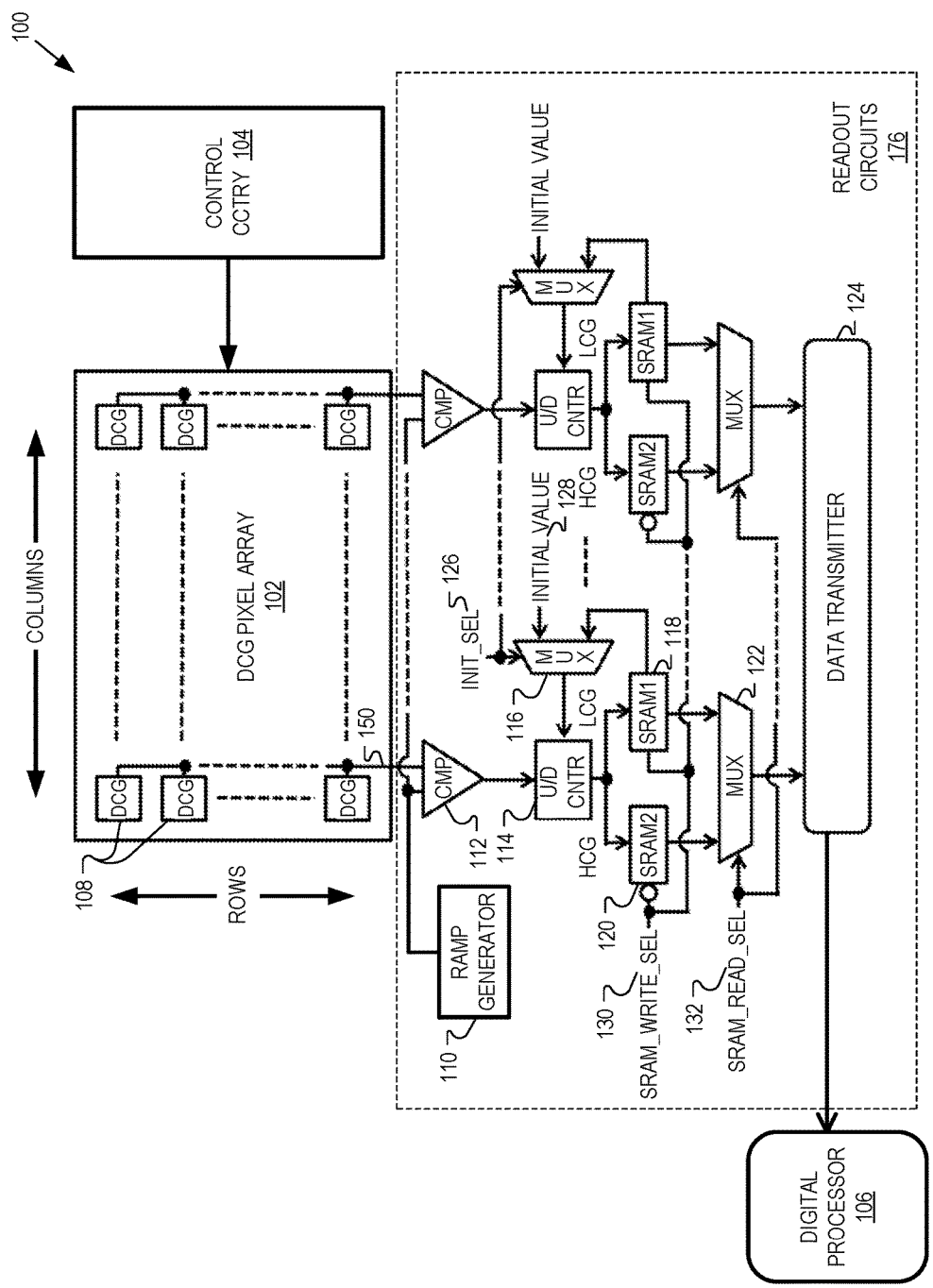
FIG. 1 illustrates one example of a dual conversion gain high dynamic range imaging system in accordance with an embodiment of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Examples of example readout circuits including example memory storage structures for use with dual conversion gain high dynamic range image sensors are described herein. In the following description, numerous specific details are set forth to provide a thorough understanding of the examples. One skilled in the relevant art will recognize; however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

To illustrate, FIG. 1 shows one example of a dual conversion gain (DCG) high dynamic range (HDR) imaging system 100 in accordance with an embodiment of the present disclosure. Imaging system 100 includes a DCG pixel array 102, control circuitry 104, readout circuits 176, and a digital processor 106. In one example, DCG pixel array 102 is a two-dimensional (2D) array of DCG pixels 108. As shown in the depicted example, the DCG pixels 108 are arranged into a plurality of rows and a plurality of columns to acquire image data of a person, place, object, etc., which can then be used to render a 2D image of the person, place, object, etc. However, it is appreciated that in other examples, DCG pixels 108 do not necessarily have to be arranged into rows and columns and may take other configurations. In one example, each DCG pixel 108 of DCG pixel array 102 may be configured for dual conversion gain operation to output high conversion gain (HCG) pixel data or low conversion gain (LCG) pixel data to provide a HDR image data in accordance with an embodiment of the present disclosure.

Figure 2:
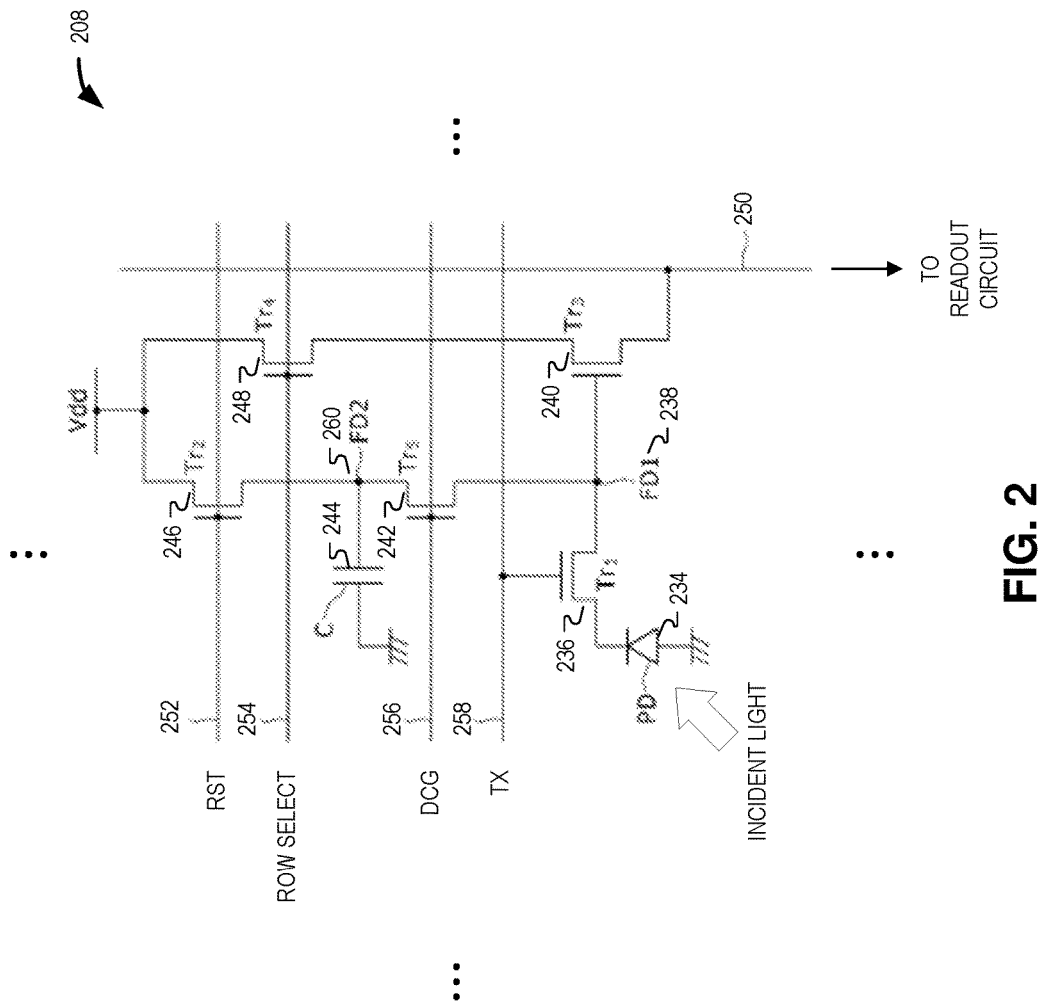
FIG. 2 is an example schematic of a dual conversion gain pixel in accordance with an embodiment of the present disclosure.

To illustrate, FIG. 2 is one example schematic of a DCG pixel 208 in accordance with an embodiment of the present disclosure. It is appreciated that DCG pixel 208 of FIG. 2 may be an example of one of the DCG pixels 108 in the DCG pixel array 102 of FIG. 1, and that similarly named or numbered elements described above may be coupled and function similarly below. As such, DCG pixel 208 may be one of the plurality of DCG pixels 108 in a respective row, and one of the DCG pixels in a respective column of DCG pixel array 102 of FIG. 1. As shown in the illustrated embodiment of FIG. 2, DCG pixel 208 includes a photodiode PD 234, a first floating diffusion FD1 238, a second floating diffusion FD2 260, a DCG capacitor C 244, a reset transistor Tr2 246, a row select transistor Tr4, a DCG transistor Tr5 242, an amplifier transistor Tr3 240, and a transfer transistor Tr1. In the depicted example, it is appreciated that amplifier transistor Tr3 240 is coupled as a source-follower transistor. It is noted that components referred to above as "transistors" in DCG pixel 208 may also be referred to as "gates."

The reset transistor Tr2 246 may be controlled by a reset signal RST 252 provided to a gate electrode of reset transistor Tr2 246. Other control signals such as ROW SELECT signal 254, DCG signal 256, and transfer TX signal 258 may be similarly provided to respective gate electrodes of row select transistor Tr4 248, DCG transistor Tr5 256, and transfer transistor Tr1 236. The various control signals may be provided by control circuitry 104 shown in FIG. 1 to control the operation of the DCG pixel 208 in order to reset the DCG pixel 208 and to readout a signal voltage, e.g., pixel data or image data output of DCG pixel 208.

In some embodiments, the image charge photogenerated by the photodiode PD 234 in response to incident light may be transferred to first floating diffusion FD1 238, second floating diffusion FD2 260, and DCG capacitor C 244 depending on the conversion gain mode—an HCG mode or an LCG mode. The transferred image charge affects the voltage on first floating diffusion FD1 238. The transfer transistor Tr1 236 is coupled to transfer the image charge from the photodiode PD 234 to the first floating diffusion FD1 238 in response to the transfer signal TX 258. The amplifier transistor Tr3 240 is coupled to the first floating diffusion FD1 238 to amplify the image charge stored in the first floating diffusion FD1 238 to generate the output signal of the DCG pixel 208 through column bitline 250, which is coupled to be read out by a readout circuit as shown in FIG. 1.

The DCG transistor Tr5 242 is coupled to the first floating diffusion FD1 238 to couple the DCG capacitor 244 and the second floating diffusion FD2 260 to the first floating diffusion FD1 238 in response to the DCG signal 256. For example, during an HCG mode, DCG transistor Tr5 242 is turned off in response to DCG signal 256, and image charge may be transferred only to first floating diffusion FD1 238 and generate some voltage difference in first floating diffusion FD1 238 which is readout via column bitline 250. Conversely, during a LCG mode, DCG transistor Tr5 242 is turned on in response to DCG signal 256, and image charge may be transferred to both of first floating diffusion FD1 238, second floating FD2 260 and DCG capacitor 244, and generate smaller difference in voltage on first floating diffusion FD1 238 compared with the case of HCG mode, and the voltage difference may be readout via column bitline 250. As such, the control signal DCG 256 may change depending on whether the HCG mode or the LCG mode is desired. Additionally, the DCG signal 256 may be changed during image data readout from each DCG pixel to obtain both the HCG mode image data and LCG mode image data, which may be subsequently combined for HDR operations.

Returning back to the example depicted in FIG. 1, after each DCG pixel 108 in DCG pixel array 102 has acquired its pixel data or image charge, the image data is readout by a respective readout circuit included in readout circuits 176, and then transferred to digital processor 106. In the depicted example, each column of DCG pixel array 102 is read out through a respective column bitline 150. In other words, there is a column bitline 150 for each column of DCG pixel array 102, and each column bitline 150 is therefore coupled to a respective DCG pixel 108 of each of the plurality of rows of DCG pixel array 150 to be read out by a respective readout circuit 176.

In one example, each readout circuit 176 for each column bitline 150 is substantially similar, and therefore, only one of the readout circuits 176 described herewith for brevity. As will be described in the depicted example, each readout circuit 176 is configured to readout HCG and LCG pixel data from DCG pixels 108 and includes a memory storage structure that includes only a single counter and a single data transmitter, which saves on layout area and semiconductor die size compared to readout circuit examples that require two counters and two data transmitters to separately read out the HCG pixel data and LCG pixel data from DCG pixels in accordance with the teachings of an embodiment of the present disclosure. The reduced number of data read outs also save power and reduce row timing, which has the additional benefit of increased frame rates.

As shown in the illustrated example, each readout circuit 176 includes a comparator 112 having a first input coupled to receive a ramp signal output from a ramp generator 110. Comparator 112 also includes a second input coupled to receive an output signal from a column bitline 150 of DCG pixel array 150. As discussed above, the output signal received from column bitline 150 may be one of a LCG signal or an HCG signal from a respective one of the DCG pixels 108. A counter 114 is coupled to receive an output of the comparator 112. In the depicted example, counter 114 is an up/down (U/D) counter, and is the single counter of readout circuit 176 coupled to the column bitline to perform analog to digital conversion. In other words, two separate counters are not needed in order to count the HCG and LCG signals from column bitline 150 in accordance with the teachings of the present disclosure.

A first memory circuit 118 and a second memory circuit 120 are coupled to receive an output of the counter 114. In one example, first memory circuit 118 and second memory circuit 120 are static random access memories (SRAM1 and SRAM2). In the depicted example, counter 114 is coupled to write to only one of the first and second memory circuits 118 or 120 at a time in response to a memory write select signal SRAM_WRITE_SEL 130. For instance, as shown in the depicted example, second memory SRAM2 120 is coupled to receive an inverted memory write select signal SRAM_WRITE_SEL 130, while first memory SRAM1 118 is coupled to receive a non-inverted memory write select signal SRAM_WRITE_SEL 130.

As shown in the depicted example, readout circuit 176 also includes a first multiplexor 116 having a first input coupled to receive an INITIAL_VALUE 128, and a second input coupled to receive an initial memory value from the first memory circuit SRAM1 118. As will be discussed, during operation counter 114 is coupled to load either the INITIAL_VALUE 128 or the initial memory value from first memory SRAM1 118 through an output of the first multiplexor 116 in response to an initial select signal INIT_SEL 126.

Readout circuit 176 further includes a second multiplexor 122 having first and second inputs coupled to the first and second memories SRAM1 118 and SRAM2 120, respectively. In operation, the second multiplexor 122 is coupled to read either an LCG memory value from the first memory circuit SRAM1 118, or an HCG memory value from the second memory circuit SRAM2 120 in response to a memory read select signal SRAM_READ_SEL 132. A data transmitter circuit 124 is coupled to the output of the second multiplexor 122 to receive the LCG memory value or HCG memory value read by second multiplexor 122. Data transmitter 124 then transmits that pixel data of the DCG pixel array to a digital processor 106 for further processing. In the depicted example, data transmitter 124 is the single data transmitter of readout circuit 176 coupled to the column bitline. In other words, two separate data transmitters are not needed in order to separately transmit the HCG and LCG signals from column bitline 150 to digital processor 106 in accordance with the teachings of the present disclosure.

It is appreciated that the memory storage structure of the readout circuit 176 utilizes three global signals, initial select signal INIT_SEL 126, memory write select signal SRAM_WRITE_SEL 130, and memory read select signal SRAM_READ_SEL 132 to control the initial values for the counter 114 (i.e., INIT_SEL 126) to write the data into first memory circuit SRAM1 118 and second memory circuit SRAM2 120 for HCG and LCG data (i.e., SRAM_WRITE_SEL 130), and to read the data from first memory circuit SRAM1 118 and second memory circuit SRAM2 120 to data transmitter 124 for HCG and LCG data (i.e., SRAM_READ_SEL 132) in accordance with an embodiment of the present invention. The use of initial values prevents the overflow caused by the variations from pixels, comparators, etc. Therefore, it is appreciated that with the disclosed memory structure of readout circuit 176, only a single counter 114 and a single data transmitter 124 are needed, which saves layout area and reduces semiconductor die size compared to an example that requires separate counters and data transmitters for the HCG and LCG data.

In various examples, it is appreciated that digital processor may simply store the image data or process the image data by applying for example post image effects (e.g., crop, rotate, remove red eye, adjust brightness, adjust contrast, or otherwise). In one example, readout circuits 176 may readout a row of image data at a time along readout column bitlines 150 (illustrated) or may readout the image data using a variety of other techniques (not illustrated), such as a serial readout or a full parallel readout of all pixels simultaneously.

In one example, control circuitry 104 is coupled to DCG pixel array 102 to control operation of the plurality of DCG pixels 108 in pixel array 102. For example, control circuitry 104 may generate a shutter signal for controlling image acquisition. In one example, the shutter signal is a global shutter signal for simultaneously enabling all DCG pixels 108 within DCG pixel array 102 to simultaneously capture their respective image data during a single acquisition window. In another example, the shutter signal is a rolling shutter signal such that each row, column, or group of DCG pixels 108 is sequentially enabled during consecutive acquisition windows. In another example, image acquisition is synchronized with lighting effects such as a flash.

In one example, imaging system 100 may be included in a digital camera, cell phone, laptop computer, or the like. Additionally, imaging system 100 may be coupled to other pieces of hardware such as a processor (general purpose or otherwise), memory elements, output (USB port, wireless transmitter, HDMI port, etc.), lighting/flash, electrical input (keyboard, touch display, track pad, mouse, microphone, etc.), and/or display. Other pieces of hardware may deliver instructions to imaging system 100, extract image data from imaging system 100, or manipulate image data supplied by imaging system 100.

Figure 3A:
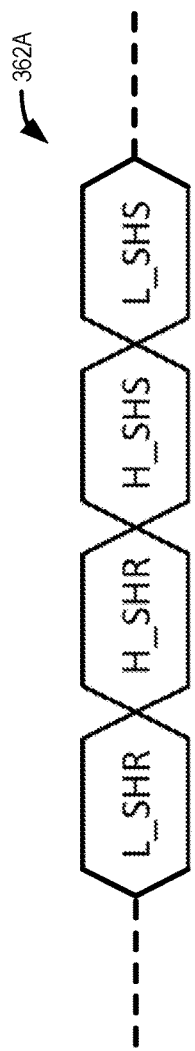
FIG. 3A is a simplified timing diagram of reading a dual conversion gain pixel array of an imaging system in accordance with an embodiment of the present disclosure.

FIG. 3A is a simplified timing diagram 362A of reading a DCG pixel array of an imaging system in accordance with an embodiment of the present disclosure. The simplified timing diagram 362A example illustrates acquisition of an HDR image including LCG and HCG pixel data being captured from a DCG pixel according to an embodiment of the present disclosure. It is appreciated that the DCG pixel from which the LCG and HCG pixel data are being acquired may be from DCG pixel 208 of FIG. 2 or one of the DCG pixels 108 in the DCG pixel array 102 of FIG. 1, and that similarly named or numbered elements described above may be coupled and function similarly below. In the example, true correlated double sampling is realized with the sample and hold of the reset voltage (i.e., L_SHR and H_SHR) on the first floating diffusion FD1 238 at both LCG and HCG, as well as the sample and hold of the signal voltage (i.e., L_SHS and H_SHS) on the first floating diffusion FD1 238 at both LCG and HCG in accordance with the teachings of the present invention.

Indeed, the LCG correlated double sampling output value of the DCG pixel is equal to a difference between the reset (e.g., black) value sampled at LCG (i.e., L_SHR) and the signal value sampled at LCG (i.e., L_SHS). In one example, the LCG correlated double sampling output value of the DCG pixel may be utilized for bright light conditions. Similarly, the HCG correlated double sampling output value of the DCG pixel is equal to a difference between the reset (e.g., black) value sampled at HCG (i.e., H_SHR) and the signal value sampled at HCG (i.e., H_SHS). In one example, the high conversion gain correlated double sampling output value of the pixel may be utilized for low light conditions.

Thus, as shown in the simplified timing diagram 362A, in the first timing interval L_SHR, the reset (e.g., black) value for LCG is sampled and held. In the second timing interval H_SHR, the reset (e.g., black) value for HCG is sampled and held. In the third timing interval H_SHS, the signal value for HCG is sampled and held. In the fourth timing interval L_SHS, the signal value for LCG is sampled and held. The correlated double sampling values for the LCG and HCG signals may then be determined by finding the differences between the respective signal and reset values for HCG and LCG.

Figure 3B:
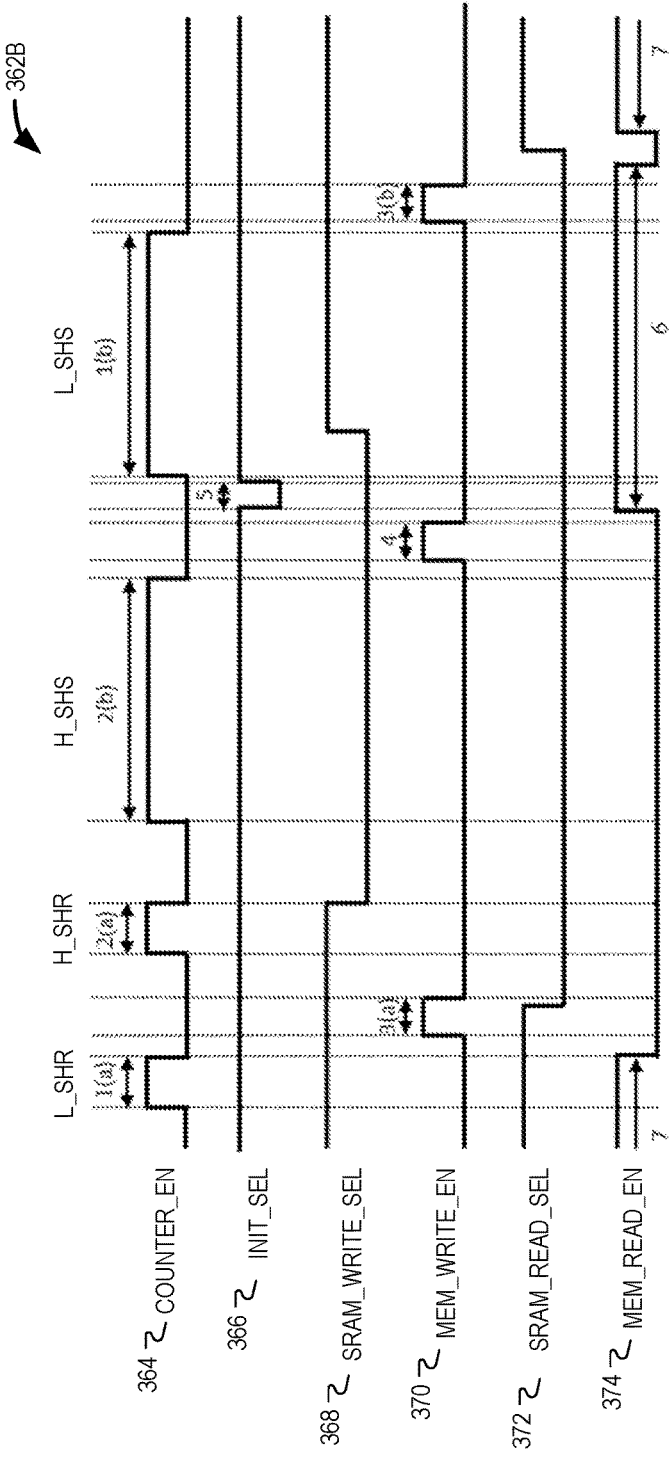
FIG. 3B is a timing diagram having increased detail of reading a dual conversion gain pixel array having example readout circuitry with example memory storage structures in accordance with an embodiment of the present disclosure.

FIG. 3B is a timing diagram 362B having increased detail compared to timing diagram 362A. Timing diagram 362B illustrates one example of the timing of reading a DCG pixel array as it relates to the example readout circuitry with example memory storage structures in accordance with an embodiment of the present disclosure. It is appreciated that the DCG pixel array and readout circuitry referred to in FIG. 3B may be examples of DCG pixel array 102 and readout circuits 176 of FIG. 1, and that similarly named or numbered elements described above may be coupled and function similarly below.

As in the timing diagram 362B example, the L_SHR timing interval described in FIG. 3A occurs at timing interval 1(a), during which time the black or reset value is sampled and held in LCG mode. At this timing interval 1(a), the COUNTER_EN 364 transitions to logic high from logic low, the INIT_SEL 366 signal remains logic high, the SRAM_WRITE_SEL 368 signal remains logic high, the MEM_WRITE_EN 370 remains logic low, the SRAM_READ_SEL 372 signal remains logic high, and the MEM_READ_EN 374 signal remains logic high. As shown, the end of a previous timing interval 7 also occurs at this time, which as will be described corresponds to the read of LCG signal data that was saved during a previous timing interval 3(b) from SRAM1 118 to the digital processor 106.

At timing interval 3(a), LCG data is written into SRAM1 118 and the SRAM_READ_SEL 372 signal transitions from logic high to logic low. The COUNTER_EN 364 signal remains logic low, the SRAM_WRITE_SEL 368 signal remains logic high, the MEM_WRITE_EN 370 signal transitions from logic low to logic high, the SRAM_READ_SEL 372 signal transitions from logic high to logic low, and the MEM_READ_EN 374 signal remains logic low.

At timing interval 2(*a*), the H_SHR timing interval described in FIG. 3A occurs, during which time the black or reset value is sampled and held in HCG mode. At this timing interval 2(*a*), the COUNTER_EN 364 transitions from logic low to logic high, the INIT_SEL 366 signal remains logic high, the SRAM_WRITE_SEL 368 signal transitions from logic high to logic low, the MEM_WRITE_EN 370 remains logic low, the SRAM_READ_SEL 372 signal remains logic low, and the MEM_READ_EN 374 signal remains logic low.

At timing interval 2(*b*), the H_SHS timing interval described in FIG. 3A occurs, during which time the signal value is sampled and held in HCG mode. At this timing interval 2(*b*), the COUNTER_EN 364 transitions from logic low to logic high, the INIT_SEL 366 signal remains logic high, the SRAM_WRITE_SEL 368 signal remains logic low, the MEM_WRITE_EN 370 remains logic low, the SRAM_READ_SEL 372 signal remains logic low, and the MEM_READ_EN 374 signal remains logic low.

At timing interval 4, HCG data is written into SRAM2 120. At this timing interval 4, the COUNTER_EN 364 remains logic low, the INIT_SEL 366 signal remains logic high, the SRAM_WRITE_SEL 368 signal remains logic low, the MEM_WRITE_EN 370 transitions from logic low to logic high, the SRAM_READ_SEL 372 signal remains logic low, and the MEM_READ_EN 374 signal remains logic low.

At timing interval 5, initial LCG data is loaded from SRAM1 118 to the up/down counter 114. At this timing interval 5, the COUNTER EN 364 remains logic low, the INIT_SEL_366 signal transitions from logic high to logic low, the SRAM_WRITE_SEL 368 signal remains logic low, the MEM_WRITE_EN 370 remains logic low, the SRAM_READ_SEL 372 signal remains logic low, and the MEM_READ_EN 374 signal transitions from logic low to logic high.

At timing interval 6, HCG signal data that was saved during timing interval 4 is read from SRAM2 120 to the digital processor 106. During this timing interval 6, the COUNTER_EN 364 transitions from logic low to logic high and then back to logic low, the INIT_SEL 366 signal transitions from logic low to logic high, the SRAM_WRITE_SEL 368 signal transitions from logic low to logic high, the MEM_WRITE_EN 370 transitions from logic low to logic high and then back to logic low, the SRAM_READ_SEL 372 remains logic low, and the MEM_READ_EN 374 signal transitions from logic low to logic high.

At timing interval 1(*b*), the L_SHS timing interval described in FIG. 3A occurs, during which time the signal value is sampled and held in LCG mode. At this timing interval 1(*b*), the COUNTER_EN 364 transitions to logic high from logic low, the INIT_SEL 366 signal remains logic high, the SRAM_WRITE_SEL 368 signal transitions from logic low to logic high, the MEM_WRITE_EN 370 remains logic low, the SRAM_READ_SEL 372 signal remains logic low, and the MEM_READ_EN 374 signal remains logic high.

At timing interval 3(*b*), LCG data is written into SRAM1 118. During this timing interval 3(*b*), the COUNTER_EN 364 signal remains logic low, the INIT_SEL 366 signal remains logic high, the SRAM_WRITE_SEL 368 signal remains logic high, the MEM_WRITE_EN signal transitions from logic low to logic high, the SRAM_READ_SEL 372 signal remains logic low, and the MEM_READ_EN 374 signal remains logic high.

At timing interval 7, the LCG data saved in SRAM 118 during timing interval 3(*b*) is read from SRAM1 118 into the digital processor 106. At this timing interval 7, the COUNTER_EN 364 signal remains logic low, the INIT_SEL 366 signal remains logic high, the SRAM_WRITE_SEL 368 signal remains logic high, the MEM_WRITE_EN 370 signal remains logic low, the SRAM_READ_SEL 372 signal remains logic high, and the MEM_READ_EN 374 signal remains logic high.

The above description of illustrated examples of the invention, including what is described in the Abstract, is not intended to be exhaustive or to limit the invention to the precise forms disclosed. While specific examples of the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific examples disclosed in the specification. Rather, the scope of the invention is to be determined entirely by the following claims, which are to be construed in accordance with established doctrines of claim interpretation.

What is claimed is:

1. A readout circuit for use with a dual conversion gain (DCG) pixel array including a plurality of DCG pixels arranged into a plurality of rows and a plurality of columns, the readout circuit comprising:
    a comparator coupled to receive a ramp signal from a ramp generator and an output signal from one of the plurality of DCG pixels, wherein the output signal is one of a low conversion gain (LCG) signal or a high conversion gain (HCG) signal;
    a counter coupled to receive an output of the comparator;
    a first memory circuit and a second memory circuit coupled to receive an output of the counter, wherein the counter is coupled to write to only one of the first and second memory circuits at a time in response to a memory write select signal;
    a first multiplexor coupled to receive an initial value and an initial memory value from the first memory circuit, wherein the counter is coupled to load either the initial value or the initial memory value from an output of the first multiplexor in response to an initial select signal;
    a second multiplexor coupled to read either an LCG memory value from the first memory circuit or an HCG memory value from the second memory circuit in response to a memory read select signal; and
    a data transmitter circuit coupled to an output of the second multiplexor to transmit pixel data of the pixel array to a digital processor.

2. The readout circuit of claim 1, wherein a second input of the comparator is coupled to receive the output signal from one of a plurality of column bitline outputs of the DCG pixel array, wherein each column bitline output is coupled to the plurality of rows of the DCG pixel array.

3. The readout circuit of claim 2, wherein the readout circuit is one of a plurality of readout circuits such that each readout circuit is coupled to a respective one of the plurality of column bitline outputs of the DCG pixel array.

4. The readout circuit of claim 2, wherein the counter is a single counter coupled to receive the output of the comparator.

5. The readout circuit of claim 2, wherein the data transmitter circuit is a single data transmitter circuit coupled to receive either the HCG memory value or the LCG memory value.

6. The readout circuit of claim 1, wherein the counter is an up/down counter.

7. The readout circuit of claim 1, wherein the first and second memory circuits are static random access memories (SRAMs).

8. The readout circuit of claim 1, wherein each DCG pixel comprises:
   a photodiode coupled to photogenerate image charge in response to incident light;
   a first floating diffusion coupled to store the image charge photogenerated in the photodiode;
   a transfer transistor coupled to transfer the image charge from the photodiode to the first floating diffusion in response to a transfer signal;
   an amplifier transistor coupled to the first floating diffusion to amplify the image charge stored in the first floating diffusion to generate the output signal;
   a row select transistor coupled to the amplifier transistor to output the output signal in response to a row select signal;
   a DCG transistor coupled to the first floating diffusion to couple a DCG capacitor to the first floating diffusion in response to a DCG signal; and
   a reset transistor coupled to a voltage to reset the first floating diffusion in response to a reset signal.

9. The readout circuit of claim 8, wherein each DCG pixel further comprises a second floating diffusion coupled to the DCG capacitor.

10. An image sensing system, comprising:
   a pixel array including a plurality of dual conversion gain (DCG) pixels arranged into a plurality of rows and a plurality of columns;
   control circuitry coupled to the pixel array to control operation of the pixel array;
   a plurality of readout circuits coupled to the pixel array to read out pixel data from the pixel array, wherein the pixel data includes low conversion gain (LCG) pixel data and high conversion gain (HCG) data, wherein each readout circuit includes:
      a ramp generator coupled to output a ramp signal;
      a comparator, wherein a first input of the comparator is coupled to receive the ramp signal from the ramp generator, wherein a second input of the comparator is coupled to a respective one of a plurality of column bitline outputs of the pixel array to receive an output signal from one of the plurality of DCG pixels, wherein the output signal is one of an LCG signal or an HCG signal;
      a counter coupled to receive an output of the comparator;
      a first memory circuit and a second memory circuit coupled to receive an output of the counter, wherein the counter is coupled to write to only one of the first and second memory circuits at a time in response to a memory write select signal;
      a first multiplexor, wherein a first input of the first multiplexor is coupled to receive an initial value, wherein a second input of the first multiplexor is coupled to receive an initial memory value from the first memory circuit, wherein the counter is coupled to load either the initial value or the initial memory value from an output of the first multiplexor in response to an initial select signal;
      a second multiplexor, wherein a first input of the second multiplexor is coupled to the first memory circuit, wherein a second input of the second multiplexor is coupled to the second memory circuit, wherein the second multiplexor is coupled to load either an LCG memory value from the first memory circuit or an HCG memory value from the second memory circuit from an output of the second multiplexor in response to a memory read select signal; and
      a data transmitter circuit coupled to the output of the second multiplexor to transmit pixel data of the pixel array; and
   a digital processor coupled to the readout circuits to receive the pixel data from the pixel array.

11. The image sensing system of 10, wherein each column bitline output is coupled to the plurality of rows of the DCG pixel array.

12. The image sensing system of 10, wherein the counter is a single counter coupled to receive the output of the comparator.

13. The image sensing system of 10, wherein the data transmitter circuit is a single data transmitter circuit coupled to receive either the HCG memory value or the LCG memory value.

14. The image sensing system of 10, wherein the counter is an up/down counter.

15. The image sensing system of 10, wherein the first and second memory circuits are static random access memories (SRAMs).

16. The image sensing system of 10, wherein each DCG pixel comprises:
   a photodiode coupled to photogenerate image charge in response to incident light;
   a first floating diffusion coupled to store the image charge photogenerated in the photodiode;
   a transfer transistor coupled to transfer the image charge from the photodiode to the first floating diffusion in response to a transfer signal;
   an amplifier transistor coupled to the first floating diffusion to amplify the image charge stored in the first floating diffusion to generate the output signal;
   a row select transistor coupled to the amplifier transistor to output the output signal in response to a row select signal;
   a DCG transistor coupled to the first floating diffusion to couple a DCG capacitor to the first floating diffusion in response to a DCG signal; and
   a reset transistor coupled to a voltage to reset the first floating diffusion in response to a reset signal.

17. The image sensing system of 16, wherein each DCG pixel further comprises a second floating diffusion coupled to the DCG capacitor.

* * * * *